Feb. 10, 1925.

L. SAIVES 1,525,695

MOTOR VEHICLE

Filed Aug. 29, 1921

Inventor.
Leon Saives
by Chas. J. O'Neill
Atty

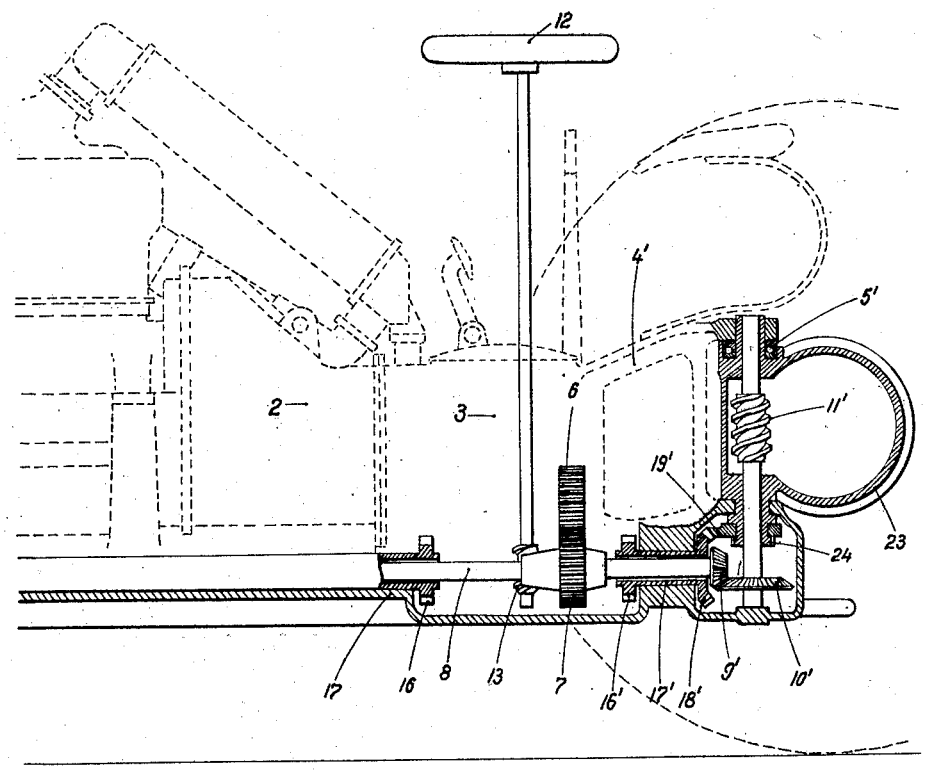

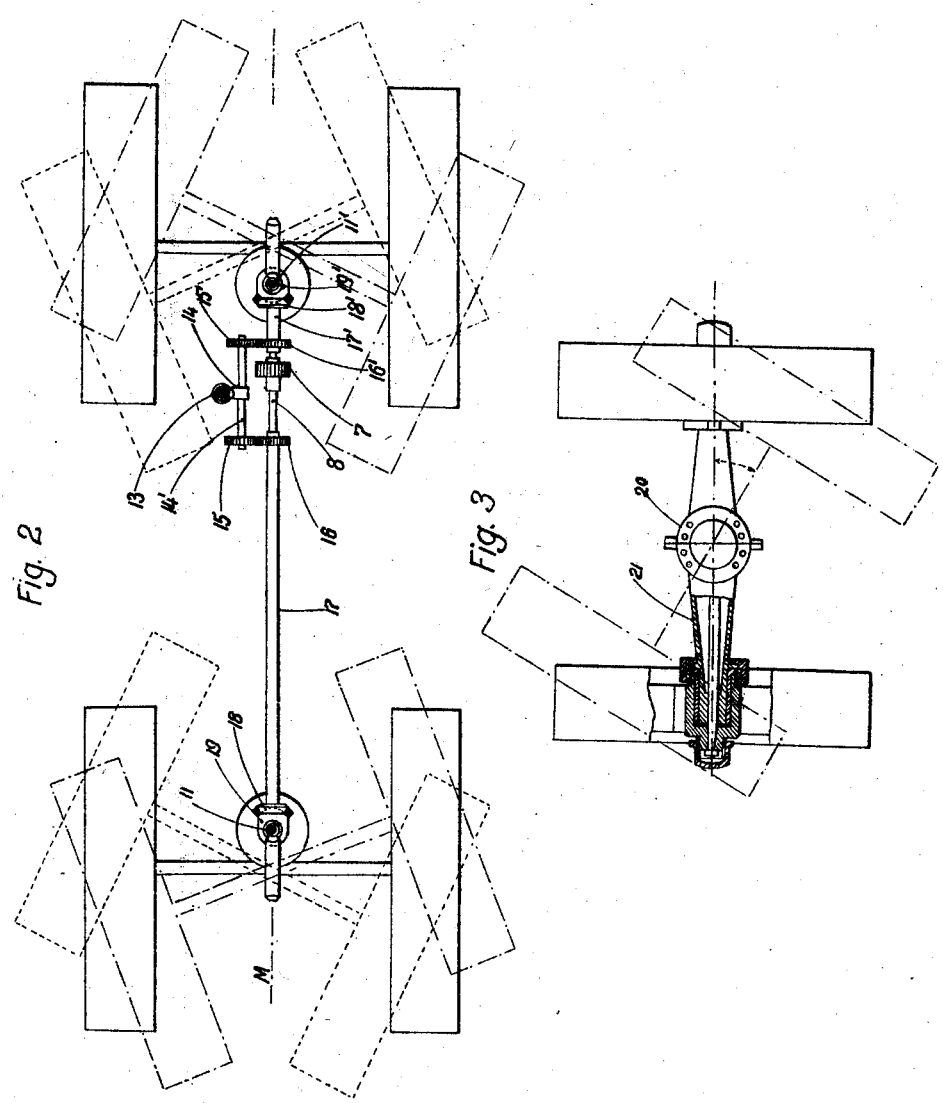

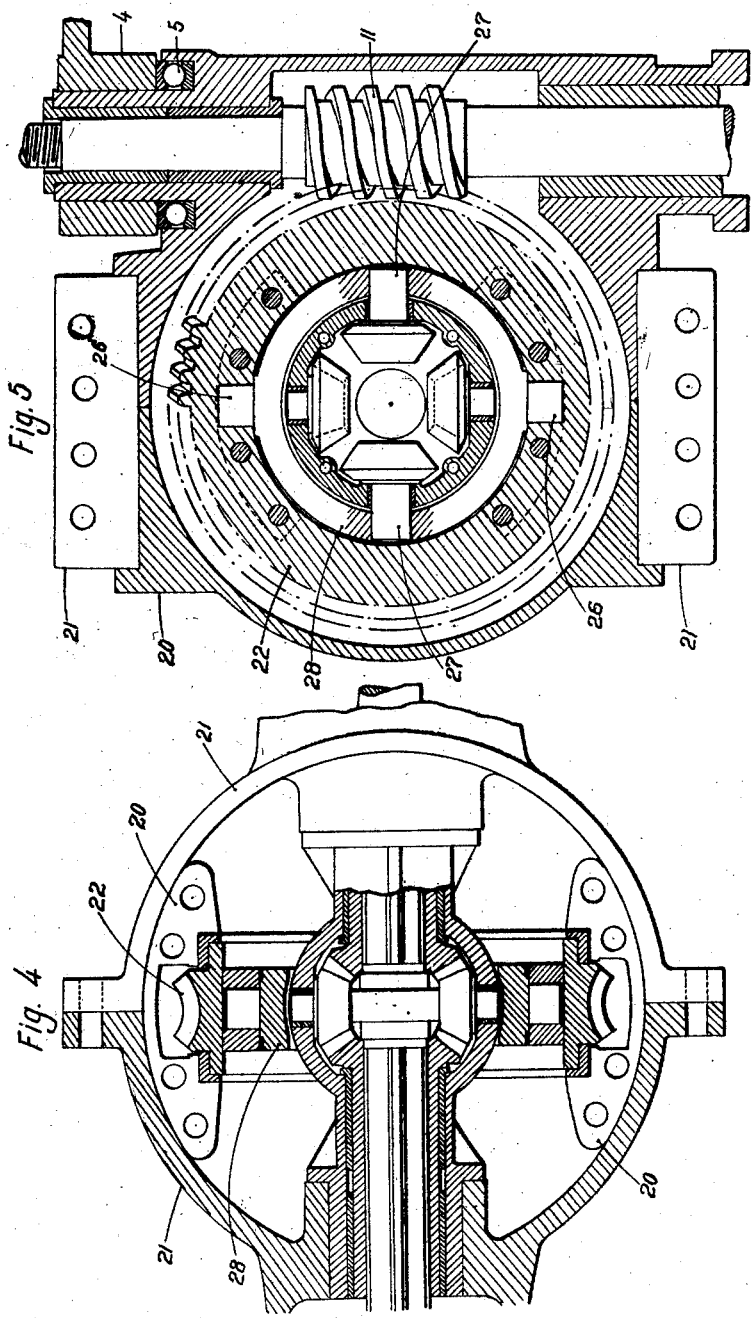

Patented Feb. 10, 1925.

1,525,695

UNITED STATES PATENT OFFICE.

LÉON SAIVES, OF BILLANCOURT, FRANCE, ASSIGNOR TO LOUIS RENAULT, OF BILLANCOURT, FRANCE.

MOTOR VEHICLE.

Application filed August 29, 1921. Serial No. 496,568.

*To all whom it may concern:*

Be it known that I, LÉON SAIVES, engineer, citizen of the French Republic, residing at Billancourt, Department of the Seine, in France, and having post-office address 15 Rue Gustave-Sandoz, in the said city, have invented certain new and useful Improvements in or Relating to Motor Vehicles; and I do hereby declare the following to be a full, clear, and exact description of the invention, such as will enable others skilled in the art to which it appertains to make and use the same.

The present invention relates to tractors having four driving wheels and its object is to provide a vehicle of this type more particularly intended for agricultural purposes but capable however of being employed for other purposes.

One of the characteristic features of the invention is that the front axle is displaceable in two planes.

1st. In a plane to meet the requirements of the draft, and

2nd. In a vertical plane to allow of the inclination of the axle relatively to the earth during working.

In the accompanying drawings:

Complementary Figures 1 and 1ª are a longitudinal vertical section of a tractor, showing the transmission mechanism, the actuating mechanism and the steering mechanism all in accordance with the present invention.

Figure 2 is a diagrammatic plan of the tractor.

Figure 3 is a front end view, partly in section, showing the front axle; the dot and dash lines in this figure indicate the inclination which can be given to the front axle in a vertical plane.

Figures 4 and 5 are sections of the front axle and mechanisms associated therewith indicating also the mode of mounting the axle on the differential gear casing.

Figure 1:
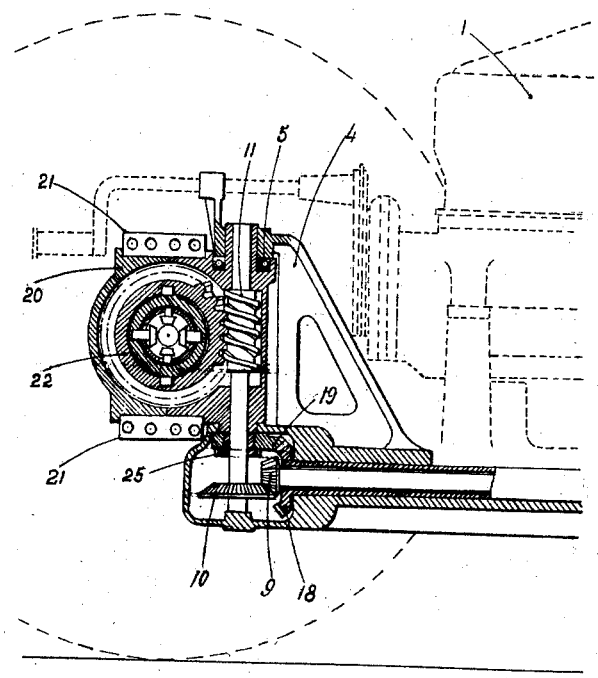

Referring to Figures 1 and 1ª the parts in dotted lines relate to the motor indicated at 1, the clutch at 2, and the change speed gear box 3, all these parts being mounted on the chassis which rests on the front and rear axles by means of suitable forked members or brackets indicated at the front at 4 and at the rear at 4' between the bearings of the brackets and wheel mountings, as at 5 and 5', are thrust ball bearings which considerably diminish the effort required to effect orientation of the axles carrying the wheels.

Power from the motor is transmitted to the front and rear axles as follows:—

The pinion 6 which forms part of the change speed gear is always in engagement with a pinion 7 keyed on a longitudinal shaft 8 on the ends of which are mounted the bevel pinions 9 and 9', in engagement with the corresponding bevel wheels 10 and 10'. The latter are keyed on vertical shafts comprising worms 11 and 11' which communicate their rotational movement to helical gear wheels rigidly connected with the differential gears of the axles.

The rear differential gear is mounted in a casing 23 capable of turning about the worm shaft; at the lower part of the casing is disposed a toothed sector 19' the purpose of which is hereinafter described.

At the front end the arrangement is practically the same; a toothed sector 19 is keyed at 25 to the lower part of the casing 20, but the mounting of the axle is different in order to allow it to oscillate in a vertical plane; this mounting is hereinafter described.

The steering drive control is effected in the following manner:—

A steering hand wheel 12 Figure 1ª drives a worm 13 which actuates a toothed sector 14 keyed on a shaft 14' on the ends of which are secured two spur wheels 15, 15' Figure 2; these two wheels gear with two spur wheels 16, 16' mounted on sleeves 17, 17' through which the transmission shaft 8 extends.

On the end of the sleeve 17' is secured a bevel gear wheel 18' which gears with the toothed sector 19'. On the end of the sleeve 17 is a bevel gear wheel 18 which gears with the toothed sector 19.

By means of the aforesaid transmission mechanism rotational movement of the hand wheel 12 in either direction effects orientation of the axles, as indicated in dotted lines in Figure 2 the two axes of the axles turning through the same angle and meeting always at a point which is in a perpendicular plane passing through the centre of the space between the two centres of rotation which centres are the axes of the worm 11, 11'.

As hereinbefore stated, the front axle besides its rotational movement about the axis of the worm 11 the said axle can also oscillate in a vertical plane; this movement is effected as follows:

The axle 21 is mounted so that it can turn about the part 20 as an axis (Figures 3, 4 and 5), the part 20 forming with the axle 21, a casing in which is arranged the driving wheel 22 actuated by the worm 11, and the differential gear which is here mounted with a Cardan joint relatively to the wheel 22. The Cardan joint is clearly indicated in Figures 4 and 5; the Cardan ring is represented at 28 and the journals thereof at 26, 26, and 27, 27. The inclination that can be given to the front axle is indicated in Figure 3; travelling on uneven ground is therefore possible by reason of the aforesaid arrangement whilst retaining the gripping action of the four driving wheels of the tractor. It is to be understood that the latter mode of mounting could be applied to either axle or both axles.

Claims:

1. In a motor vehicle, the combination with a chassis, of a casing vertically pivoted on said chassis, means for turning said casing on its vertical pivot, a wheeled axle pivoted on said casing and provided with shafts for driving the wheels, a worm wheel mounted in said casing in a vertical plane including the axis of the pivotal connection of the casing with the chassis, mechanism comprising a differential gearing associated with a Cardan joint mounted in the casing for transmitting motion from the worm wheel to the axle shafts, a worm shaft journaled in the casing coincidentally with the vertical pivot of said casing and engaging said worm wheel, and engine driven mechanism for rotating said worm shaft.

2. In a motor vehicle, the combination with a chassis, of a casing vertically pivoted on said chassis, hand-operated means for turning the casing on its horizontal pivot, an axle housing journaled on said casing and carrying wheels at its opposite ends, axle shafts journaled in said housing and having driving connections with said wheels, differential gearing connecting the axle shafts and connected by a Cardan joint with a worm gear mounted in said casing to rotate in a vertical plane including the axis of the pivotal connection of the casing with the chassis, a worm shaft journaled in the casing with its axis coincident with the pivotal connection of the casing with the chassis and engaging said worm gear, and an engine driven shaft having a driving connection with said worm shaft.

3. In a motor vehicle, the combination with a chassis, of a casing vertically pivoted on said chassis, a tubular shaft journaled in the chassis and connected by gearing with the vertical pivot of the casing so that rotation of the shaft will impart a turning movement to the casing on its vertical pivot, manually operated means for rotating said shaft, a wheeled axle mounted on said casing and provided with shafts for driving the wheels, a rotatable element mounted in the casing, an engine driven shaft extending through the tubular shaft and having a driving connection with said element, and differential gearing mounted in said casing to transmit motion from said element to the wheel shafts.

4. In a motor vehicle, the combination with a chassis, of a casing vertically pivoted on said chassis, a worm shaft journaled in said casing coincident with the axis of the vertical pivot, a tubular shaft journaled in the chassis and connected by gearing with the vertical pivot of the casing so that rotation of the shaft will impart a turning movement to the casing on its vertical pivot, manually operated means for rotating the tubular shaft, an engine driven shaft extending through the tubular shaft and having a driving connection with said worm shaft, a worm wheel journaled in said casing and engaging said worm shaft, a wheeled axle mounted on said casing and provided with shafts for driving the wheels, and differential gearing mounted in the casing to transmit motion from the worm wheel to the wheel shafts.

5. In a motor vehicle, the combination with a chassis, of casings carrying wheeled axles vertically pivoted on the opposite ends of the chassis, tubular shafts journaled in opposite ends of the chassis with each shaft connected by gearing with the vertical pivot of the casing on the same end of the chassis so that the rotation of the shaft will impart a turning movement to the connected casing, manually operated means connected with both shafts to simultaneously rotate the same to effect simultaneous turning movements of both casings, and an engine driven shaft extending through said tubular shafts and having driving connections at its ends with the wheels of both axles.

In testimony whereof I affix my signature.

LÉON SAIVES.